United States Patent [19]
Okada et al.

[11] Patent Number: 6,049,670
[45] Date of Patent: Apr. 11, 2000

[54] IDENTIFIER MANAGING DEVICE AND METHOD IN SOFTWARE DISTRIBUTION SYSTEM

[75] Inventors: Toshiro Okada; Norihiko Igarashi; Hiroshi Oki; Shinji Kamata; Takashi Hara; Toshiya Yamazaki, all of Kawasaki, Japan

[73] Assignee: Fujitsu Limited, Kawasaki, Japan

[21] Appl. No.: 08/571,104

[22] Filed: Dec. 12, 1995

[30] Foreign Application Priority Data

Jan. 10, 1995 [JP] Japan .................................. 7-001798

[51] Int. Cl.$^7$ .................................................. G06F 13/00
[52] U.S. Cl. ............................................................ 395/712
[58] Field of Search ..................................... 395/186, 712, 395/200.3, 200.47, 200.53; 707/1, 10; 380/4; 705/21, 1

[56] References Cited

U.S. PATENT DOCUMENTS

| | | | |
|---|---|---|---|
| 4,949,257 | 8/1990 | Orbach | 705/21 |
| 5,103,476 | 4/1992 | Waite et al. | 380/4 |
| 5,408,608 | 4/1995 | Ryu et al. | 707/10 |
| 5,588,146 | 12/1996 | Leroux | 707/1 |
| 5,628,015 | 5/1997 | Singh | 395/186 |
| 5,689,560 | 11/1997 | Cooper et al. | 380/4 |
| 5,717,930 | 2/1998 | Imai et al. | 395/712 |
| 5,835,911 | 11/1998 | Nakagawa et al. | 707/3 |

FOREIGN PATENT DOCUMENTS

| | | |
|---|---|---|
| 60-54046 | 3/1985 | Japan . |
| 61-36842 | 2/1986 | Japan . |
| 61-220030 | 9/1986 | Japan . |
| 62-251833 | 11/1987 | Japan . |
| 63-213027 | 9/1988 | Japan . |
| 63-296136 | 12/1988 | Japan . |
| 2-244353 | 9/1990 | Japan . |
| 2-292634 | 12/1990 | Japan . |

*Primary Examiner*—Tod R. Swann
*Assistant Examiner*—Matthew Smithers
*Attorney, Agent, or Firm*—Staas & Halsey LLP

[57] ABSTRACT

An identifier managing device is used in a software distribution system in which software programs are distributed to distribution terminals from a distribution center through a network, for managing information including identifiers of the distribution terminals. A host computer in the distribution center sells the software programs corresponding to the request from users at the distribution terminals, each of which is assigned a terminal identifier and a terminal password. Each of the users is assigned a user identifier and a user password. A distribution identifier is written in the software programs before the software programs are sold, and the host computer manages the history of the distribution of the software using these identifiers and the passwords. The terminal password is rewritten whenever the terminal accesses the host computer for preventing illegal duplications of the software programs at the users end.

24 Claims, 13 Drawing Sheets

USER INFORMATION

| UID, PSW, MID, · · · , USER NAME , · · · |
|---|

FIG. 3

MACHINE INFORMATION

| MID, MPSW, UID, · · · , MODEL NAME | SELLING RECORD |
|---|---|

FIG. 4

SELLING RECORD (NO. 1)

| SOFTWARE NAME | UID | SELLING DATE |
|---|---|---|

FIG. 5

SELLING RECORDS (NO. 2)
| NAME OF THE SOFTWARE | UID | SELLING DATE | DID |
|---|---|---|---|
FIG. 13
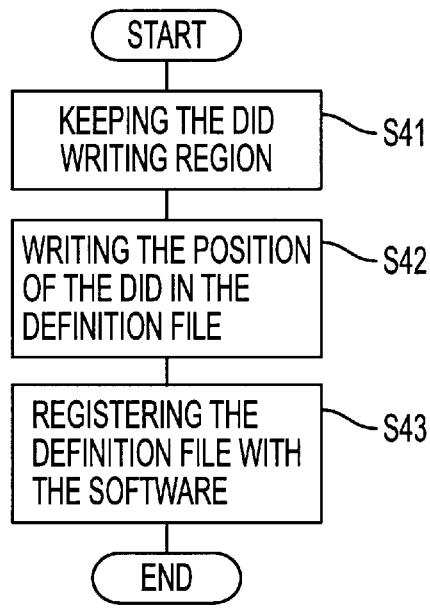
FIG. 14
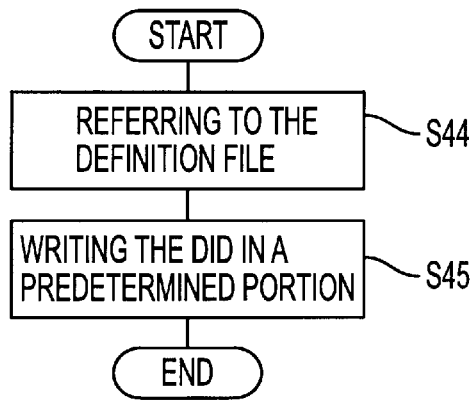
FIG. 15

AN EXAMPLE OF THE CONTENTS OF WRITING
REGION FOR DID

```
BLOCK "StringFileInfo"
BEGIN
      BLOCK "040904E4"
      BEGIN
            VALUE "Comment","AAAAAAAA"
            ~
      END
END
```

FIG. 17

AN EXAMPLE OF THE DEFINITION FILE

```
[MARK]
FILE=SOFT.EXE
index=8E80
NUM=8
```

FIG. 18

AN EXAMPLE OF THE RENEWAL OF THE DID

| 8E80 | 8E81 | 8E82 | 8E83 | 8E84 | 8E85 | 8E86 | 8E87 |
|------|------|------|------|------|------|------|------|
| A    | A    | A    | A    | A    | A    | A    | A    |

↓

| 8E80 | 8E81 | 8E82 | 8E83 | 8E84 | 8E85 | 8E86 | 8E87 |
|------|------|------|------|------|------|------|------|
| G    | D    | F    | 0    | 2    | 2    | 5    | 6    |

FIG. 19

IDENTIFIER MANAGING DEVICE AND METHOD IN SOFTWARE DISTRIBUTION SYSTEM

BACKGROUND OF THE INVENTION

1. Field of the Invention

The present invention relates to a system for distributing a software program through a network, and more specifically to a device and method for managing (controlling or administering) an identifier indicating information about a destination to which a software program is distributed.

2. Description of the Related Art

Many kinds of software packages are currently available at computer stores. For most of the software packages, the number of machines, for example personal computers, to which a software package may be installed, or the number of grouped machines working simultaneously executing a software package, is restricted. Some of the software packages are allowed to be installed for only one personal computer, and some of them are allowed to be installed for a plurality of personal computers, but only one of the plurality of the personal computers can be used to execute the software package at one time.

For example, when a software program used in WINDOWS is installed, information regarding a license registration is commonly written onto a floppy disk, in order to prevent unauthorized duplication of the software program. However, this method does not effectively prevent duplication of the software program, because false information can be used as license registration information and the information can be rewritten by freeware after the software program is installed.

SUMMARY OF THE INVENTION

As personal computer communications are developing, an on-line system in which individuals can purchase a software program through a network is desired. In implementing this system, a contract for using the software program would be set between the vendor and the user. Limitations on installing and using the software program must be imposed on the users, and the use of the software program must be managed at the vendor end, in order to prevent unauthorized duplication of the software program.

The following measures should be taken for the online system for distributing a software program through a network.

Since the present protection method using a floppy disc cannot be used for an on-line system, the user can easily duplicate a software program, from a machine on which the software program is installed to another machine. Therefore, a mechanism for monitoring such unauthorized duplication is necessary for the online system.

If the software program installed in the machine becomes unserviceable for some reason, a mechanism for restoring the software program is necessary for the on-line system.

Furthermore, if many software programs are distributed through the on-line system, a mechanism for identifying each of the distributed software programs is necessary for the on-line system.

The object of the present invention is to provide a device and a method for managing identifiers indicating a terminal and a user to which the software program is distributed, and for indicating the distributed software, used in the on-line software distribution system.

An identifier managing device and an identifier managing method according to the present invention are used in an on-line software distribution system, in which a software program is distributed to a terminal from a distribution center through a network.

The identifier managing device according to the invention includes a managing unit, a terminal password changing unit, a distribution identifier adding unit, a user information storage unit, a terminal information storage unit, a distribution record storage unit, a definition file storage unit, and a software storage unit.

The software storage unit stores the software program to be distributed, the user information storage unit stores user information, including a user identifier which indicates a user to which the software program is distributed, and the terminal information storage unit stores terminal information, including a terminal identifier which indicates a terminal in which the software program is installed. The managing unit manages the user information and the terminal information by relating the user information stored in the user information storage unit with the terminal information stored in the terminal information storage unit.

The distribution record storage unit stores a distribution record of the software program in relation to the terminal identifier. The managing unit may manage a distribution history of the software program using the user information, the terminal information, and the distribution record.

The terminal information storage unit may store the terminal information including a first terminal password which corresponds to the terminal identifier and is provided to the terminal. The managing unit may recognize an access from the terminal using the terminal identifier and the first terminal password.

The terminal password changing unit may change the first terminal password to a second terminal password when an terminal having the first terminal password accesses the distribution center. In this case, the managing unit may relate the second terminal password to the terminal identifier.

The definition file storage unit stores a definition file in which information used for writing the distribution identifier is described. When the software program is distributed to the terminal, the distribution identifier adding unit writes the distribution identifier into the software program by referring to the definition file stored in the definition file storage unit, and writes the distribution identifier into the distribution record stored in the distribution record storage unit.

The managing unit may check a distribution identifier of a software program, which is distributed to a user who accesses the distribution center, by referring the definition file.

The identifier managing method according to the invention is used for managing a software program distributed to a terminal from a distribution center through a network. The identifier managing method includes the steps of, storing user information including a user identifier indicating a user to which the software program is distributed, storing terminal information including a terminal identifier indicating a terminal in which the software program is installed, and managing the user information and the terminal information by relating the user information with the terminal information.

The identifier managing method may further include the steps of, storing a distribution record of the software program in relation to the terminal information, and managing a distribution history of the software program using the user information, the terminal information, and the distribution record.

The identifier managing method may further include the steps of, providing a first terminal password associated with the terminal identifier to the terminal, recognizing an access to the distribution center from the terminal by the terminal identifier and the first terminal password, and changing the first terminal password to a second terminal password to relate the second terminal password to the terminal identifier when a terminal having the first terminal identifier accesses the distribution center.

BRIEF DESCRIPTION OF THE DRAWINGS

FIG. 3 shows user information used in the software distribution system;

FIG. 4 shows machine information used in the software distribution system;

FIG. 5 shows an selling record used in the software distribution system;

FIG. 13 shows a selling record used in the software distribution system;

FIG. 14 is a flow-chart showing the process of setting the distribution identifier DID according to the invention;

FIG. 15 is a flow-chart showing the method of writing the distribution identifier DID into the definition file according to the invention;

FIG. 17 shows an example of the contents of the writing region for the distribution identifier DID;

FIG. 18 shows an example of the definition file; and

FIG. 19 shows an example of the renewal of the distribution identifier DID.

DESCRIPTION OF THE PREFERRED EMBODIMENT

An embodiment according to the present invention will be described below.

Figure 1:
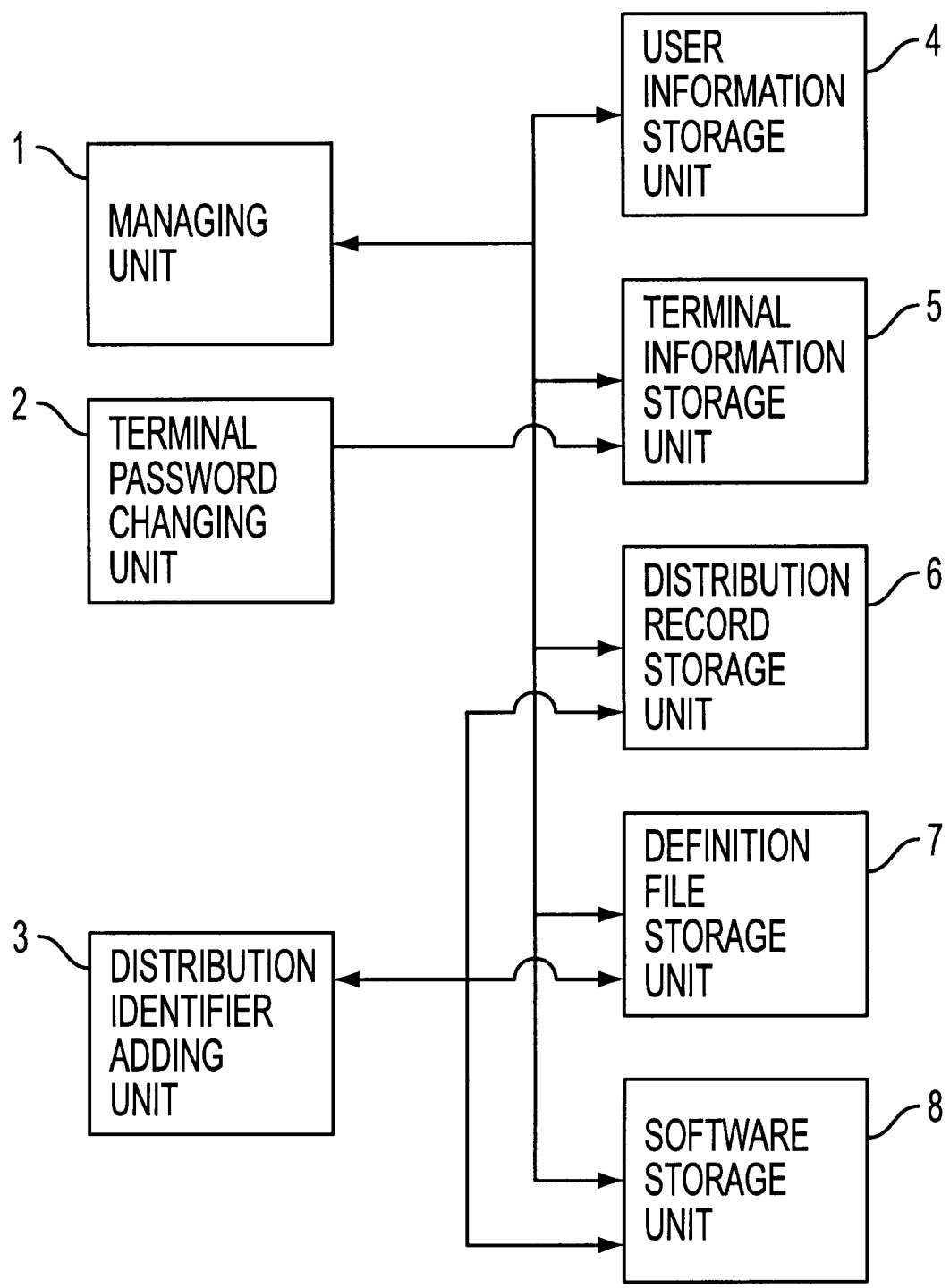
FIG. 1 shows a configuration of an embodiment of the identifier managing device according to the invention.

FIG. 1 shows a configuration of the embodiment of the identifier managing device according to the invention.

The identifier managing device comprises a managing unit 1, a terminal password changing unit 2, a distribution identifier adding unit 3, a user information storage unit 4, a terminal information storage unit 5, a distribution record storage unit 6, a definition file storage unit 7, and a software storage unit 8.

The software storage unit 8 stores a software program to be distributed, the user information storage unit 4 stores user information including a user identifier which indicates a user to which the software program is distributed, and the terminal information storage unit 5 stores terminal information including a terminal identifier which indicates a terminal in which the software program is installed. The managing unit 1 manages the user information and the terminal information by relating the user information stored in the user information storage unit 4 with the terminal information stored in the terminal information storage unit 5.

The distribution record storage unit 6 stores a distribution record of the software program in relation to the terminal identifier, and the managing unit 1 manages a distribution history of the software program using the user information, the terminal information, and the distribution record.

The terminal information storage unit 5 stores the terminal information including a terminal password which corresponds to the terminal identifier and is provided to the terminal. The managing unit 1 recognizes an access from the terminal using the terminal identifier and the terminal password.

The terminal password changing unit 2 changes the first terminal password to a new terminal password when a terminal having the terminal password accesses the distribution center. Then, the new terminal password is stored in the terminal information storage unit 5 and in the terminal, and the managing unit 1 relates the new terminal password to the terminal identifier.

The definition file storage unit 7 stores a definition file in which information used for writing the distribution identifier is described. When the software program is distributed to the terminal, the distribution identifier adding unit 3 writes the distribution identifier into the software program in the software storage unit 8 by referring to the definition file stored in the definition file storage unit 7, and writes the distribution identifier into the distribution record stored in the distribution record storage unit 6.

The managing unit 1 checks a distribution identifier of a software program, which is distributed to a user who accesses the distribution center, by referring to the definition file.

Figure 2:
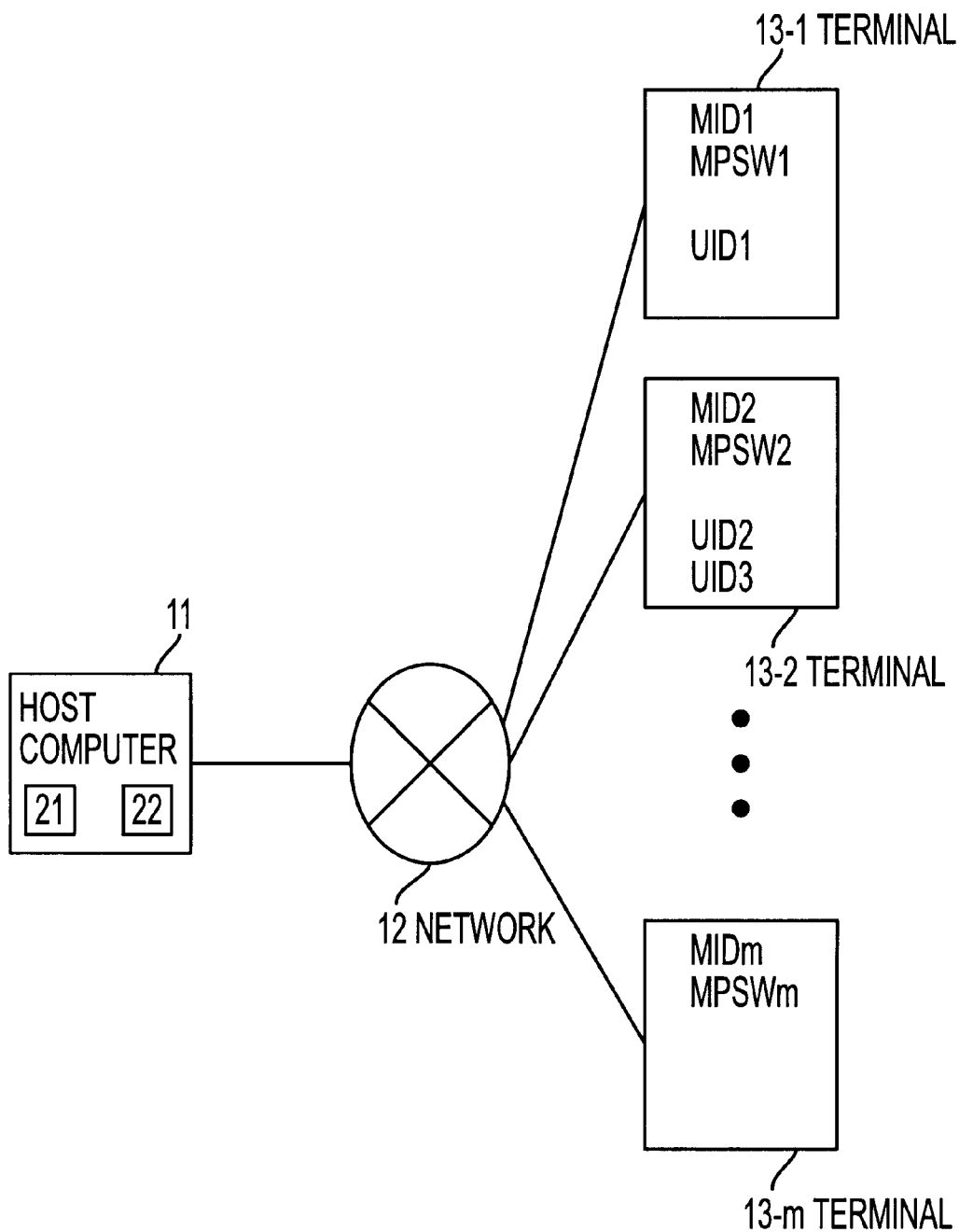
FIG. 2 shows a configuration of a software distribution system according to the invention.

The managing unit 1, the terminal password changing unit 2, and the distribution identifier adding unit 3 are included in a processing device 21 in a host computer 11 shown in FIG. 2. The processing device 21 may realize the functions of these units by software or hardware. The user information storage unit 4, the terminal information storage unit 5, the distribution record storage unit 6, the definition file storage unit 7, and the software storage unit 8 are included in a storage device 22 in the host computer 11.

The distribution record corresponds to selling records shown in FIG. 4, FIG. 5, and FIG. 13. The information written in the definition file storage unit 7 for writing the distribution identifier includes a name of a file in which the distribution identifier is written, a position of a writing region in the file, and a size of the writing region.

The managing unit 1 manages the user identifier and the terminal identifier, relating the user identifier stored in the user information storage unit 4 with the terminal identifier stored in the terminal information storage unit 5. Therefore, it is possible to recognize which user receives the software program and which terminal the software program is installed in.

Since the distribution record stored in the distribution record storage unit 6 is related to the terminal identifier, the history of each distributed software program can be managed in relation to the terminal information of the terminal in which the software program is installed.

The terminal password corresponding to the terminal identifier is written in the terminal information in the terminal information storage unit 5 and in the terminal. When the terminal accesses the distribution center, the managing unit 1 recognizes which terminal is now accessing the distribution center by the terminal identifier and the terminal password. If the terminal password of the terminal which is now accessing does not correspond to the terminal identifier, the managing unit 1 recognizes an illegal action at the terminal side.

The terminal password changing unit 2 changes the terminal password to a new terminal password when the terminal accesses the distribution center. When the terminal center is accessed after the terminal password is changed, the terminal now accessing is recognized using the terminal identifier and the new terminal password. If a user duplicates the software program installed in the terminal together with the terminal identifier and the terminal password, and accesses the terminal center from another terminal using the duplicated software program, the managing unit 1 recognizes an illegal action at the terminal side, because the previous terminal password is cancelled after the software-distributed terminal accesses the terminal center.

The distribution identifier adding unit 3 writes the distribution identifier into the software program to be distributed according to the information for writing in the definition file stored in the definition file storage unit 7. The managing unit 1 may check the distribution identifier in the software program held by the user by referring to the definition file. Using the user identifier of the user who receives the software program as the distribution identifier, the managing unit 1 can recognize that a user who accesses the terminal center is identical to the user who received the distributed software program.

Since the distribution identifier is written into the distribution record stored in the distribution record storage unit 6, the managing unit 1 can compare the distribution identifier in the distribution record with the distribution identifier written in the software program held by the user.

FIG. 2 shows a configuration of a software distribution system according to the invention. The software distribution system comprises host computer 11, a plurality of (m-th) terminals 13-1, 13-2, . . . , 13-m, and a network 12 which connects the host computer 11 and the terminals.

The distribution center is equipped with the host computer 11, which sells the software program through the network 12 in response to the requests from the terminals 13-1, 13-2, . . . , 13-m. The terminals 13-1, 13-2, . . . , 13-m are, for example, personal computers set in, for example, offices and houses of the users. Each of the users can purchase the software program through the network 12 and access the host computer 11 using the purchased software programs.

The host computer 11 includes the identifier managing device of the present invention as the processing device 21 and the storage device 22, issues the terminals 13-1, 13-2, . . . , 13-m with the corresponding terminal identifiers (machine identifiers) MID1, MID2, . . . , MIDm, and issues the users at the terminals 13-1, 13-2, . . . , 13-m with the corresponding user identifiers UID1, UID2, and UID3. The host computer 11 sets the terminal passwords (machine passwords) MPSW1, MPSW2, . . . , MPSWm respectively corresponding to the terminal identifiers MID1, MID2, . . . , MIDm, and the user passwords (not shown) respectively corresponding to the user identifiers UID1, UID2, and UID3. The host computer 11 manages the terminals 13-1, 13-2, . . . , 13-m and the users which receive the distributed software programs by the terminal identifiers MID1, MID2, . . . , MIDm, the terminal passwords MPSW1, MPSW2, . . . , MPSWm, the user identifiers UID1, UID2, and UID3, and the user passwords.

If the software program sold to the user becomes unserviceable for some reason, the host computer 11 restores the software program by referring to the selling record. The host computer 11 also provides an update service for the sold software programs. Furthermore, by dynamically changing the terminal passwords provided to the terminals and checking the terminal passwords, the host computer 11 observes whether or not the installed software program is duplicated into other terminal.

When the terminal is transferred from the user to another person, the software program installed in the terminal may be transferred with the rights to receive an update service and a restoration service for the software program by the host computer 11. This transference system protects against illegal copying of the software and is useful for both user and vendor because these rights can be easily transferred through the network.

FIG. 3 and FIG. 4 respectively show the example of the user information and the terminal (machine) information used in the software distribution system. The user information includes user identifier UID, user password PSW, terminal identifier MID, and the name of the user (user name). The terminal information includes terminal identifier MID, the terminal password MPSW, user identifier UID, the model name of the terminal, and the selling record of the software program.

FIG. 5 shows the selling record used in the software distribution system. The selling record includes the name of the sold software program (software name), the user identifier UID of the user who purchases the software program, and the selling date of the software program.

As shown in these figures, host computer 11 links the terminal identifier MID, the user identifier UID, the user name, the model name, the software name, selling date, and the selling record to each other to store and manage them as selling information of the software program. Using the selling information, the host computer 11 can recognize when, by whom, and to which terminal the software program was sold and installed, to make the selling record of the software program. Further, using the selling information, the host computer 11 can selectively provide service information about, for example, an update of the software program to the user who purchased the software program.

A person who pays for the software program does not always use the software program, and a terminal in which the software program is installed is not always used by the person who bought the software program. The usage patterns about the user and the terminal would be as follows;

(1) one user uses a plurality of terminals;
(2) a plurality of users use one terminal; and
(3) a mixture of (1) and (2).

Usage contracts corresponding to the usage patterns may be as follows;

(1) the software program is allowed to be installed in only one terminal;
(2) the software program is allowed to be installed in a plurality of terminals, but the software program is not allowed to be used by the plurality of terminals concurrently; and (3) the software program is allowed to be installed in a plurality of terminals, and allowed to be used by the plurality of terminals concurrently (freeware).

Managing patterns for the usage contracts are as follows;

(1) Which terminal the software program was installed in is managed in relation to the terminal identifier MID;

(2) which user the software program was sold to is managed in relation to the user identifier UID; and (3) Managing for the selling destination is not necessary because the selling pattern is freeware.

Both the terminal identifier MID and the user identifier UID are used for managing the usage patterns of (1) and (2). In the present invention, the host computer 11 provide the user identifier UID, which is unique to the contracted user, and the terminal identifier MID, which is unique to the contracted terminal.

Using the user identifier UID, the host computer 11 decides which user must pay the selling price at the time of selling the software program. Therefore, the price of the software program sold with a user identifier UID must be paid for by the user having the corresponding user identifier UID according to the contract. The sold software program is managed in relation to the terminal identifier MID of the terminal to which the software program is sold. Therefore, it is easily recognized who bought the software program and to which terminal the software program was installed. Furthermore, it is possible to provide services of, for example, the restoration of the software program if the software program becomes unserviceable for some reason.

Figure 6:
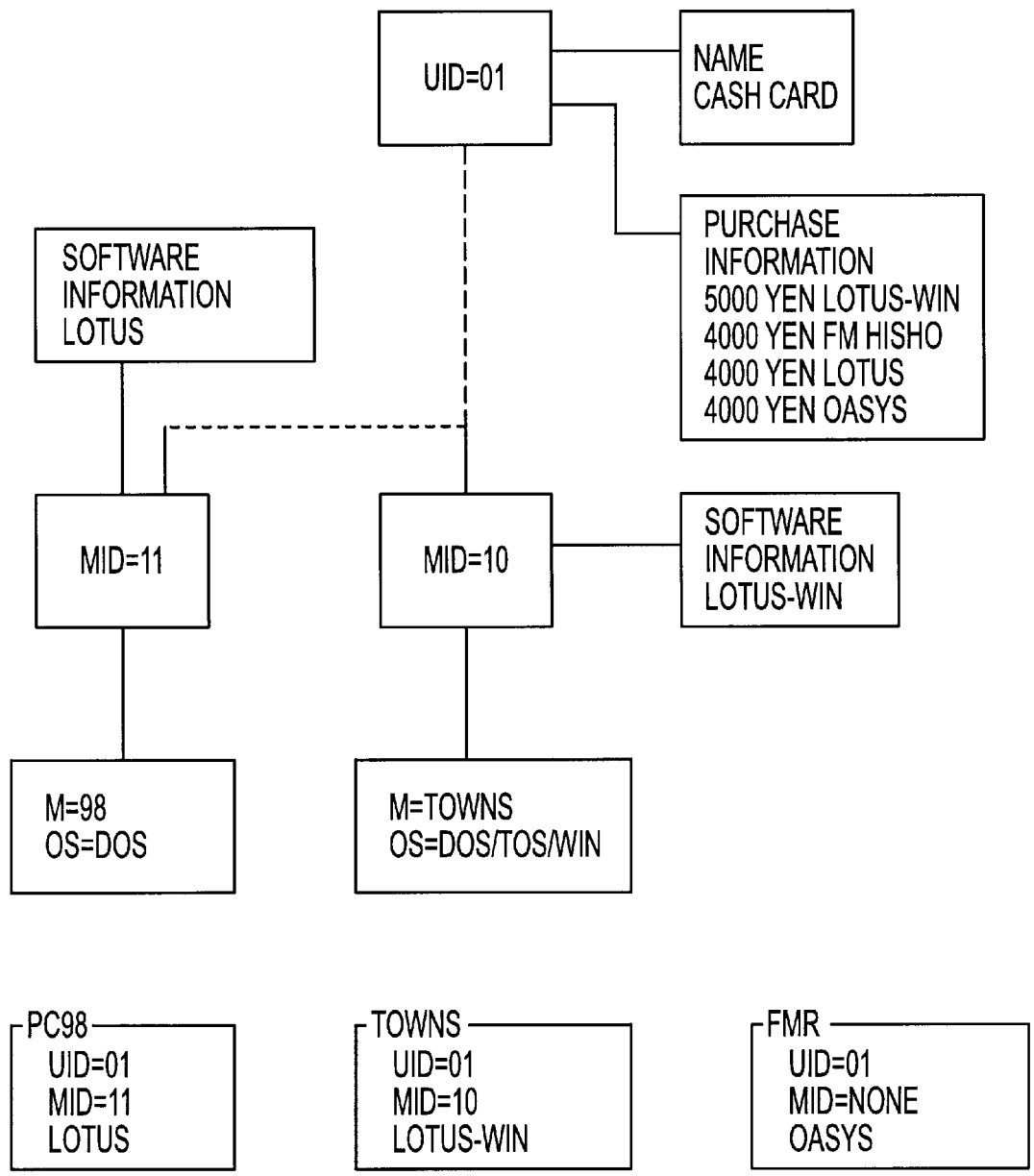
FIG. 6 shows an example of information used in the software distribution system when a user has a plurality of terminals.

FIG. 6 shows information managed by the host computer 11 when one user has a plurality of terminals.

In this figure, the user information includes the user identifier UID of 01 (UID=01), the user name, information (number) of a cash card of the user, and purchase information of the software program. The purchase information includes a list showing the name and the price of the software program which was sold to the user from the distribution center. The purchase information is obtained by referring to, for example, the selling information having the corresponding user identifier UID. The purchase information in FIG. 6 shows that the user having the user identifier UID of 01 bought the software programs LOTUS-WIN, FM HISHO, LOTUS, and OASYS.

The three terminals of PC98, TOWNS, and FMR, belong to the user having the user identifier UID of 01. Among these terminals, PC98 and TOWNS, which respectively have the terminal identifiers MIDs of 11 and 10, have been registered in the host computer 11. The two terminals are related to the user identifier UID of 01 at the time of the registration. The user identifier UID may be written into the machine (terminal) information at the time of the registration as shown in FIG. 4, or the machine information may be related to the user information by a pointer.

The machine information of the registered terminal includes the terminal information MID, software information about software programs sold and installed to the terminal, and information about the model type of the terminal and used operating system (OS). The software information corresponds to the selling record shown in FIG. 4.

In the case of FIG. 6, the software program installed in the terminal having the terminal identifier MID of 11 is LOTUS, the model type (M) of the terminal is 98, and the used OS is DOS. The software program installed in the terminal having the terminal identifier MID of 10 is LOTUS-WIN, the model type (M) of the terminal is TOWNS, and the used OS's are DOS, TOS (OS for TOWNS), and WIN (WINDOWS). Though OASYS has been installed in the terminal type FMR, no terminal identifier MID is given to FMR because FMR has not been registered in the host computer 11.

Figure 7:
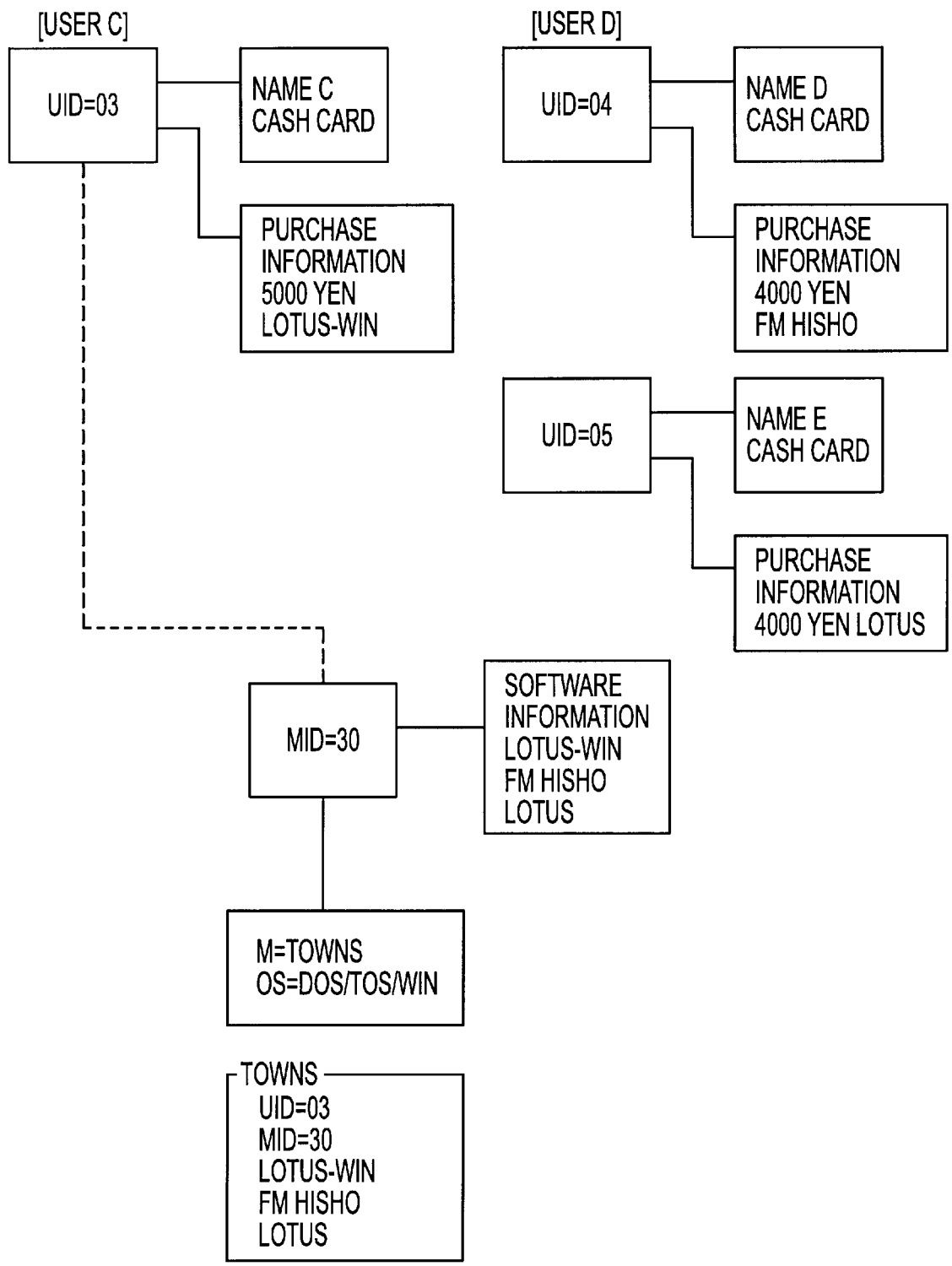
FIG. 7 shows an example of information used in the software distribution system when a terminal is used by a plurality of users.

FIG. 7 shows information managed by the host computer 11 when one terminal is used by a plurality of users. In this figure, user C, user D, and user E use the terminal of TOWNS jointly.

The user information of user C includes the user identifier UID of 03 (UID=03), the name of the user (Name C), information on a cash card of user C, and the purchase information of LOTUS-WIN. The user information of user D includes the user identifier UID of 04 (UID=04), the name of the user (Name D), information on a cash card of user D, and the purchase information of FM HISHO. The user information of user E includes the user identifier UID of 05 (UID=05), the name of the user (Name E), information on a cash card of user E, and the purchase information of LOTUS.

The terminal (machine) information of the terminal TOWNS includes the terminal information of 30 (MID=30), the software information, the model name of the terminal (M=TOWNS), and the OS used in the terminal (OS=DOS/TOS/WIN). The software information includes the names of all of the software programs sold to the three users, which are LOTUS-WIN, FM HISHO, and LOTUS.

The terminal identifier MID of the terminal TOWNS is related to the user identifier UID of one of the users, who is the representative, at the time of the registration. In this case, the terminal identifier MID of 30 is related to the user identifier UID of user C, who is the representative and the reference of the three. Although user D purchased FM HISHO, if FM HISHO becomes unserviceable for some reason, any of the three users can request the restoration of FM HISHO and can receive the free restoration service or the free re-install service of this software program.

Referring to FIG. 8 through FIG. 11, the flow of the processes according to the software distribution system of this embodiment will be described.

Figure 8:
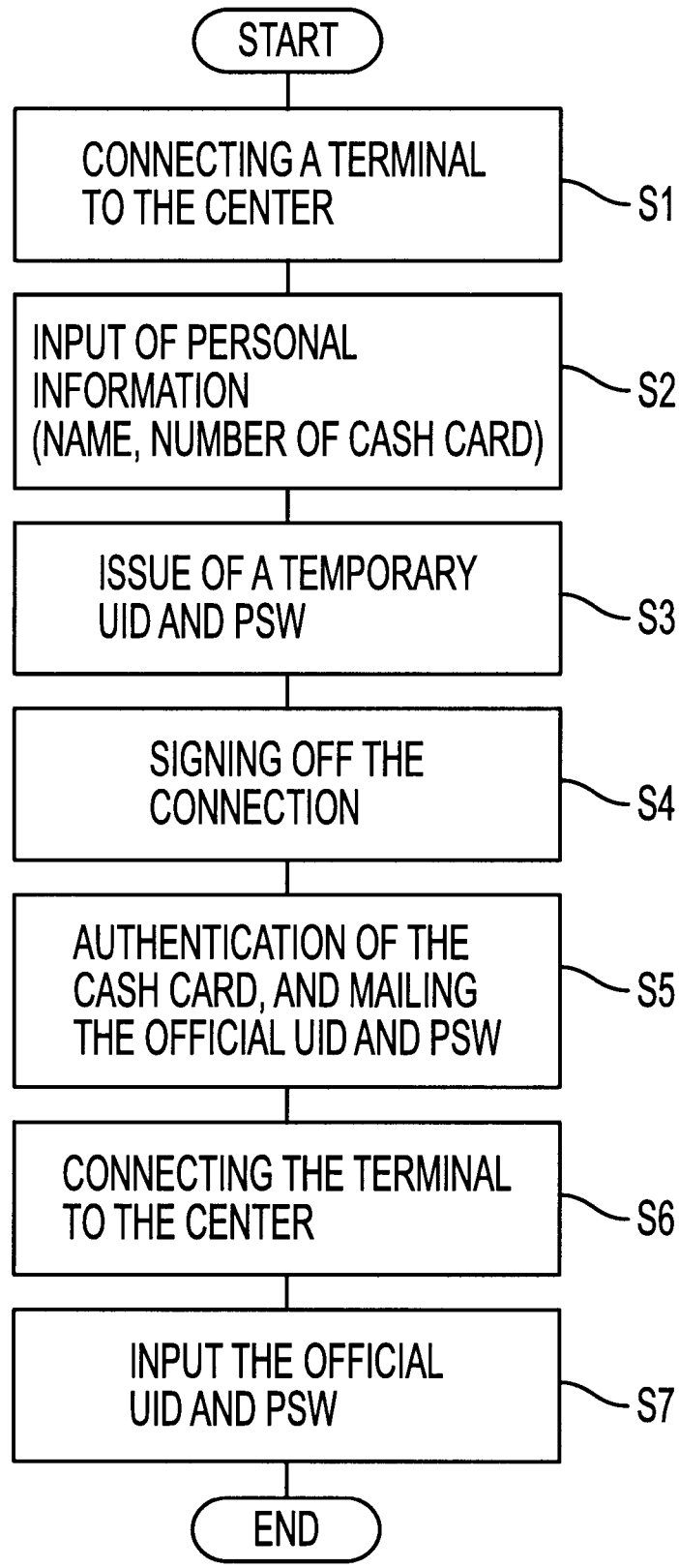
FIG. 8 is a flow-chart showing the registration process for the user identifier according to the invention.

FIG. 8 is a flow-chart showing the registration process for user identifier UID.

When the registration process is started, the user connects his terminal with the host computer 11 in the distribution center (step S1), then, inputs his name, the number of his cash card, and personal information of, for example, his address (step S2). Receiving this input information, the host computer 11 issues a temporary user identifier and a temporary user password to temporarily register the user (step S3). After that, the user signs off the connection to the host computer 11 (step S4), and waits for the authentication of the cash card.

After the cash card is authenticated, the distribution center mails an official user identifier UID and an official user password PSW to the user (step S5). Then, the user connects the terminal with the host computer 11 again (step S6), and enters the received official user identifier UID and the received official user password PSW to the host computer 11 from the terminal (step S7). Receiving these data, the host computer 11 recognizes that the user has received the official user identifier UID and the official user password PSW, registers the user officially, and finishes the process. The user can input another password together with the mailed user password PSW and register these passwords.

Figure 9:
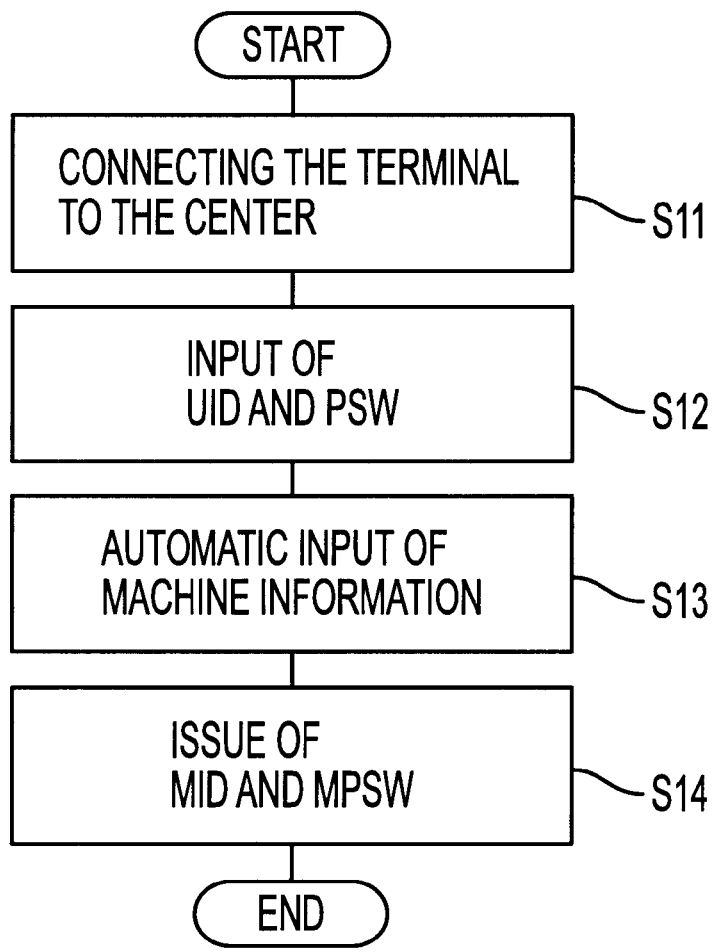
FIG. 9 is a flow-chart showing the registration process for the terminal identifier according to the invention.

FIG. 9 is a flow-chart showing the registration process for the terminal identifier MID.

When the registration process is started, the user connects his terminal with the host computer 11 in the distribution center (step S11) and inputs the registered user identifier UID and the registered user password PSW (step S12). Then, the terminal sends the machine (terminal) information on the type of the terminal, the OS used in the terminal, and the like, to the host computer 11 automatically (step S13). The host computer 11 issues and attaches the terminal identifier MID and the terminal password MPSW to the received machine information, stores them according to a specified format, and sends the terminal identifier MID and the terminal password MPSW back to the terminal (step S14). The issued terminal identifier MID and the issued terminal password MPSW are stored in the terminal.

Figure 10:
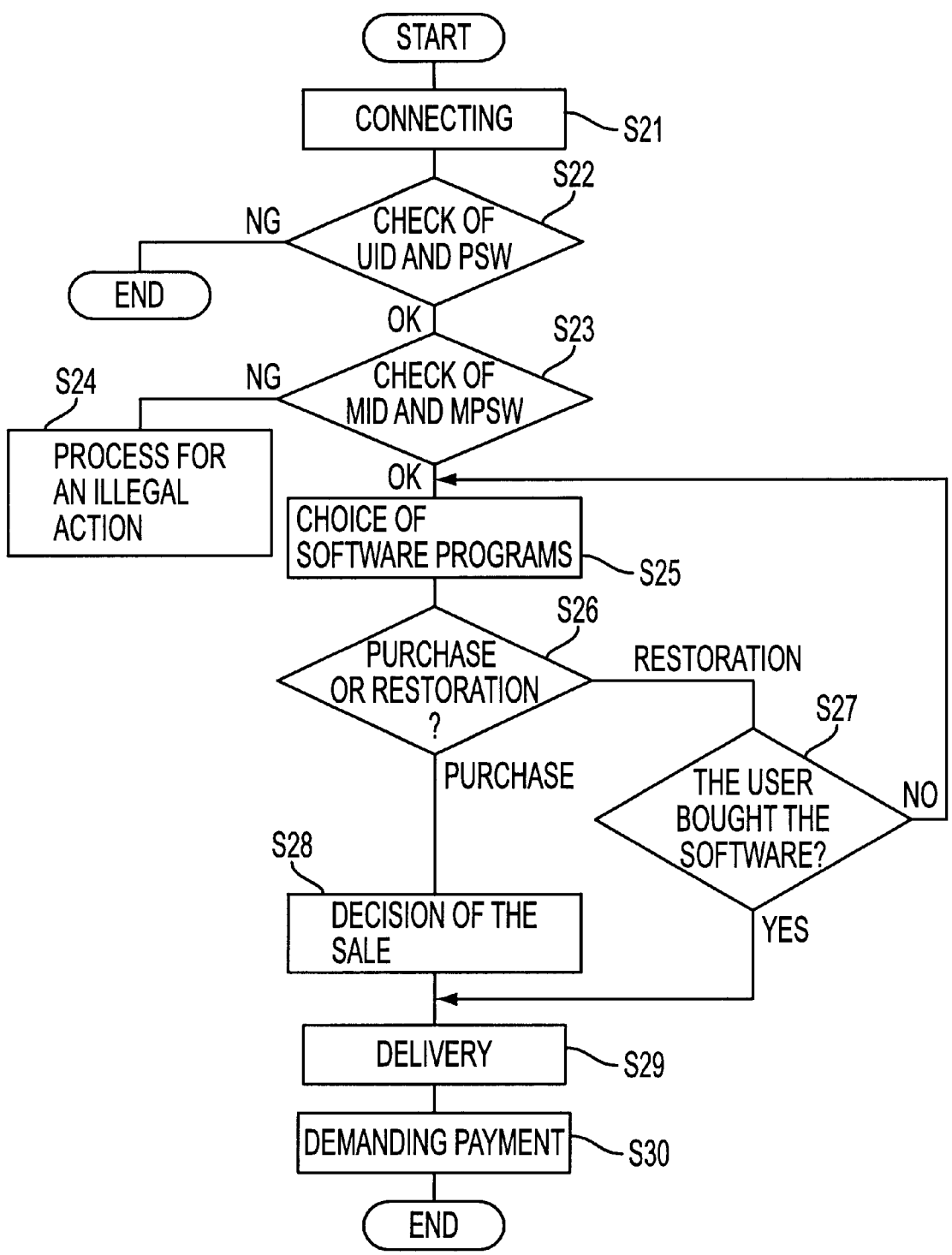
FIG. 10 is a flow-chart showing the software selling process according to the invention.

FIG. 10 is a flow-chart showing the software selling process, in which the software program is sold to an user registered in the distribution center through the network 12.

When the process is started according to, for example, a request from the user, the terminal of the user is connected with the network 12 (step S21). Then, the host computer 11 checks the user identifier UID and the user password PSW (step S22). If these data have not been registered in the host computer 11 or these data do not match each other (step S22, NG), the process is finished.

If the user identifier UID and the user password PSW have been registered in host computer 11 and these data match each other (step S22, OK), the host computer 11 reads and checks the terminal identifier MID and the terminal password MPSW stored in the terminal automatically (step S23). If the terminal identifier MID and the terminal password MPSW do not match each other, these data do not correspond to the user identifier UID or the user password PSW, or the terminal password does not correspond to the previous terminal password (step S23, NG), a process for an illegal action is performed because the data may have been duplicated illegally (step S24).

If the terminal identifier MID and the terminal password MPSW are correct (step S23, OK), the host computer 11 displays the list of software programs to be sold on the screen of the terminal, and the user can choose a software program from the list (step S25). At the same time, the user inputs a purchase request or a restoration request for the chosen software program.

Next, the host computer 11 decides whether the request from the user is a purchase request or a restoration request (step S26). If the request is a restoration request, the host computer 11 checks whether or not the user purchased the corresponding software program before, by referring to the purchase information of the user (step S27). If the user did not purchase the software program (step S27, NO), the process goes back to step S25 because the user does not have the right to receive the restoration service.

If the user purchased the corresponding software program earlier (step S27, YES), the host computer 11 delivers the requested software program to the terminal to install it again (step S29). Then, the host computer 11 demands the payment from the user according to a usage contract (step S30) and finishes the process.

If the host computer 11 receives the purchase request for the software program from the user at step S26, the host computer 11 decides to sell the chosen software program (step S28) and delivers the software program to the terminal to install it (step S29). Then, the host computer 11 demands the payment from the user (step S30) and finishes the process.

A data file, data base, and the like, other than a software program, can be sold by the above described selling process.

In step S30, the payment is imposed on the user who has the input user identifier, and the management of the user identifier UID is entrusted to the user. Each user designates the user passwords PSW to manage the user identifier UID.

If the selling contract for the software program indicates that the software program is sold to the terminal in which the software program is installed and is not sold to the user, the payment is imposed on the terminal in step S30. In this case, the host computer 11 checks whether or not the corresponding software program is sold to the terminal at step S27, and provides the restoration service only if the software program is sold to the terminal.

The host computer 11 adds the original terminal password to the terminal with the terminal identifier and automatically renews the terminal password to manage it every time the terminal is connected to the host computer 11. If the sold software program is duplicated illegally, since the terminal using the duplicated software program accesses the host computer with the terminal password which was used before the last renewal, the host computer can recognize the illegal duplication. The host computer 11 can backtrace or backup the terminal identifier and the terminal password.

Figure 11:
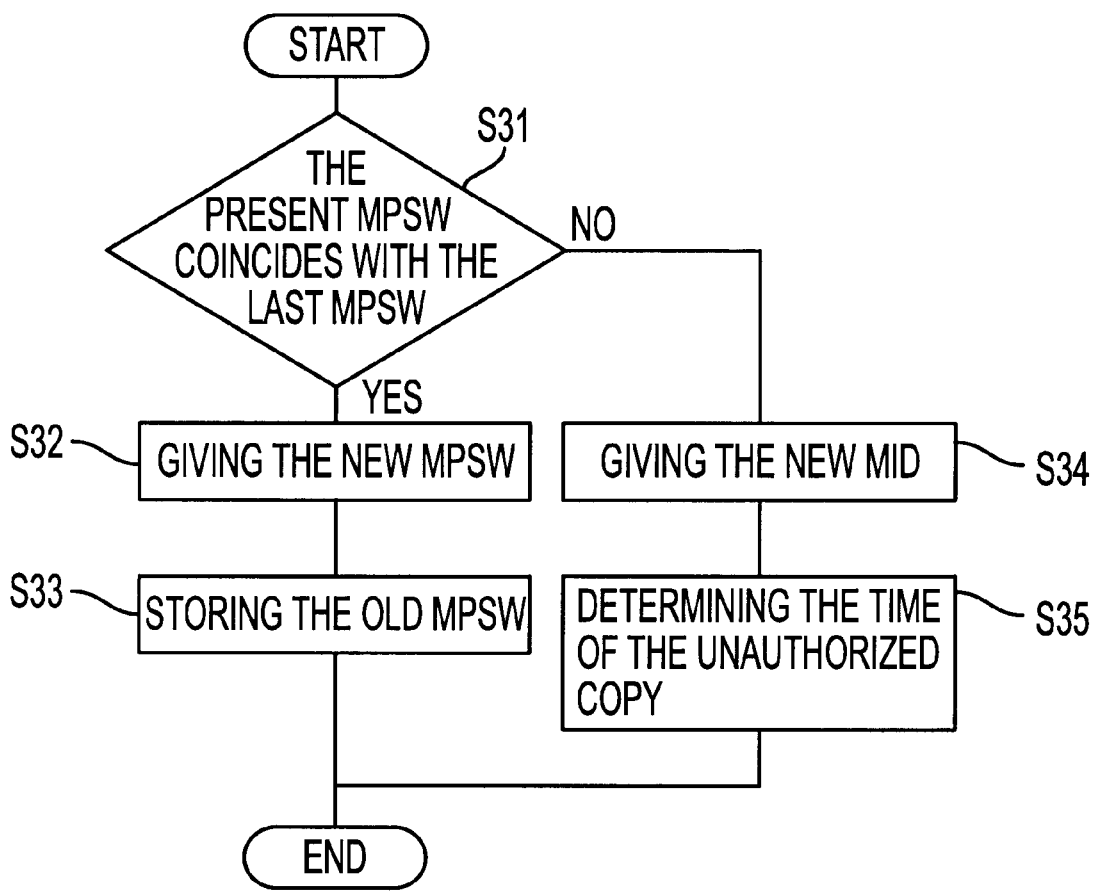
FIG. 11 is a flow-chart showing the checking process for the terminal password according to the invention.

FIG. 11 is a flow-chart showing the check process and rewriting process for the terminal password of step S23, and the process for an illegal action of step S24 in FIG. 10.

When the process is started, the host computer 11 compares the terminal password of the connected terminal with the terminal password which was provided when the terminal was connected the last time (step S31). If the two terminal passwords are the same (step S31, YES), the host computer 11 creates a new terminal password to write into the terminal and stores it in the terminal information storage unit 5 (step S32). The new terminal password is decided using a table of random numbers or similar unpredictable method. The old terminal password is also stored in the host computer 11 to be referred to later (step S33), then the process finishes.

When the two terminal passwords are not the same in step S31, the host computer 11 decides that an unauthorized duplication has been made, and provides a new terminal identifier to the connected terminal for managing the terminal (step S34). Further, the host computer continuously compares the terminal password obtained in the current connection with old terminal passwords stored in the host computer 11 to find the date of the last access which was done using this terminal password (step S35), thereby specifying the time at which the unauthorized duplication was made. The date can be obtained by referring to date information stored in the host computer 11. After step S35, the process is finished.

Figure 12:
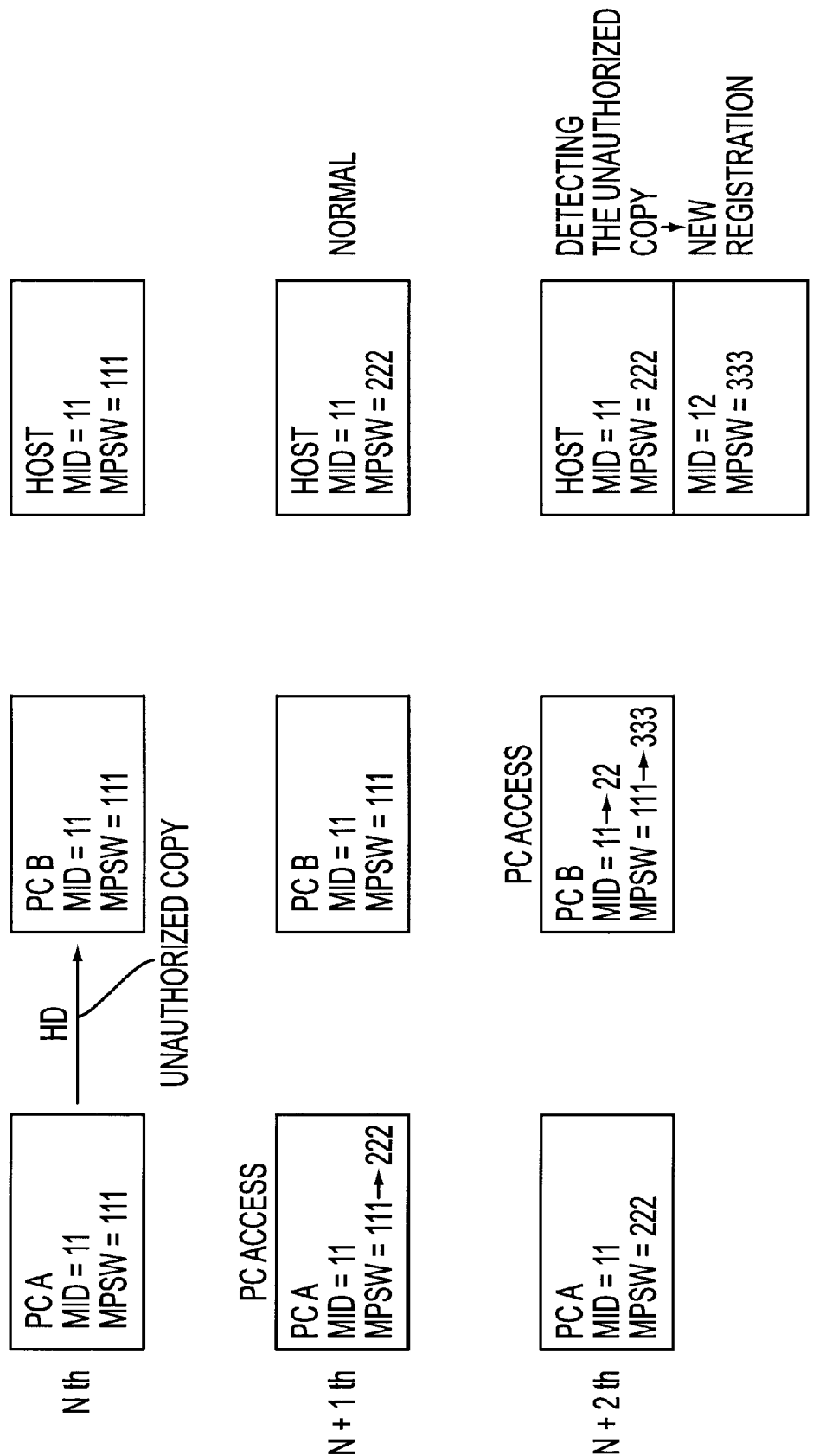
FIG. 12 shows an example of the method of checking the terminal password.

FIG. 12 shows an example of the checking process for the terminal password when an unauthorized duplication has been made.

This figure shows that the user of terminal PC-A illegally duplicated his software program from a hard disc of terminal PC-A to a hard disc of terminal PC-B together with his terminal identifier MID of 11 and his terminal password MPSW of 11, after the N-th access to the host computer 11. In this case, terminal PC-A, terminal PC-B, and the host computer 11 hold the same terminal identifier MID and the same terminal password MPSW.

In the N+1-th access from terminal PC-A, the same terminal identifier MID and the same terminal password MPSW as those stored in the host computer 11 are used for the access (step S31). Therefore, the host computer 11 does not recognize the unauthorized duplication. Then, the host computer 11 changes the terminal password MPSW to the new terminal password of 222, which is stored in the terminal and the host computer 11 (step S32).

In the N+2-th access from terminal PC-B, the terminal identifier MID used for this access is identical to that stored in the host computer 11, but the used terminal password MPSW does not correspond to that stored in the host computer 11 (step S31). Then, the host computer 11 recognizes that the terminal now accessing (PC-B) is different from the last accessing terminal (PC-A), and that an unauthorized duplication has made.

After the N+2-th access, the host computer 11 changes the terminal identifier MID and the terminal password MPSW of the terminal PC-B to 12 and 333, respectively, and stores them (step S34), thereby registering and managing the terminal PC-B as a new terminal.

According to the above described identifier managing method, an unintentional unauthorized duplication can be prevented. However, an user who intentionally makes an unauthorized duplication and who has sufficient knowledge of computers, can duplicate the terminal identifier MID and the terminal password MPSW between terminals each time of accessing. In this case, the detection of an unauthorized duplication is difficult. To prevent such a kind of unauthorized duplication, methods by which a lot of time is needed for the duplication, for example, a method using a hidden file, a method in which the terminal identifier and the terminal password are dispersed and specially arranged in the storage of the terminal, or a method in which the terminal identifier and the terminal password are coded with the terminal information for each terminal, can be used with the present invention.

The hidden file method is used in a computer using MSDOS, and the user can only find the hidden file by a special operation. Therefore, it becomes very difficult to duplicate the terminal identifier and the terminal password if they are written in a hidden file.

When the information of the terminal password is divided into portions, which are separately written on a hard disc of the terminal, it takes a long time to find all of the portions to know all information of the terminal password.

Furthermore, a method, in which the correct terminal password is obtained by predetermined computations using terminal-specific information of, for example, a serial number of the terminal, a formatting date, or a position of the file, or information which varies for each terminal, can be used. The predetermined computations, which include arbitrary combinations of, for example, multiplication or division of EOR (end of record) values, complicates the procedure for obtaining the terminal password.

Combinations of above described methods can be used with the present invention, which makes unauthorized copying more difficult because the user has to spend more time to duplicate the information.

The identifier managing device according to the invention enables decreasing of the possibility of unauthorized duplication by users having little knowledge of computers, and requires a lot of time for an user to intentionally illegally duplicate the software program.

According to the above described embodiment, the vendor can recognize whether or not the unauthorized duplication has been made, and when the duplication has been done, but cannot recognize by what route the software program was duplicated. To recognize the route, a mark, which is stored in the host computer 11, may be added to the sold software program.

Referring to FIG. 13 through FIG. 19, an identifier managing method using such a mark will be described.

The host computer 11 writes the distribution identifier into the software program as a mark used for identifying the sold software program, before sending the software program for selling on-line. Information of, for example, the user identifier, the terminal identifier, or the selling date, which enable identification that the software program was definitely sold, may be used as the distribution identifier. Especially when the user identification of the user who purchased the program is used as the distribution identifier, it becomes easy to know who bought the software program which has been duplicated.

FIG. 13 shows an example of the selling record included in the machine (terminal) information. The selling record in this figure includes the selling record in FIG. 5 and the added distribution identifier DID.

FIG. 14 is a flow-chart showing the process for setting the distribution identifier DID. This process may be performed when a producer of the software program registers the software program in the distribution center 11.

After the process is started, the host computer 11 keeps a region for writing the distribution identifier DID in a predetermined portion of a file of the software program to be registered (step S41), then prepares a definition file used for installing the software program, in which the position of the region is written (step S42). Next, the host computer 11 registers the definition file with the software program (step S43) and finishes the process.

FIG. 15 is a flow-chart showing the process for writing the distribution identifier DID into the definition file. This process is performed after step S28 in FIG. 10 in which the software program is decided to be sold.

When the process is started, the host computer 11 refers to the definition file of the software program to be sold and decides the name of the file into which the distribution identifier DID is written and the position of the DID writing region in the file (step S44). Then the host computer 11 writes the specific distribution identifier DID into the predetermined portion in the file (step S45), then finishes the process.

Figure 16:
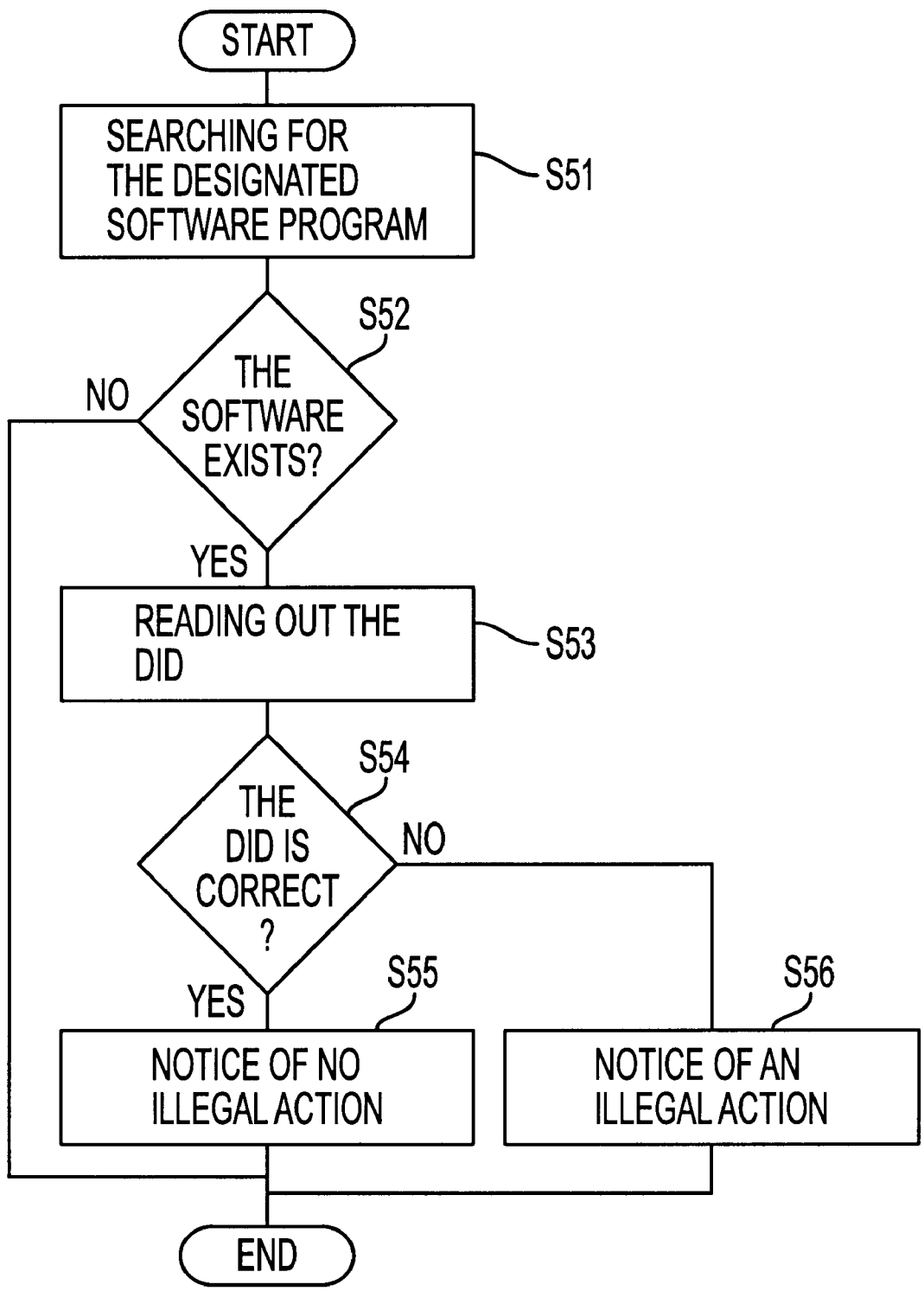
FIG. 16 is a flow-chart showing the method of checking the distribution identifier DID according to the invention.

FIG. 16 is a flow-chart showing the process for checking the distribution identifier DID. This process is performed when the user designates a software program to be checked and requests to check whether or not the software has been duplicated.

After the process is started, the host computer 11 searches software programs stored in the users terminal for the designated software program (step S51) and then decides whether or not the designated software program exists (step S52). If the designated software program does not exist (step S52, NO), the process is finished. If the designated software program exists (step S52, YES), the host computer 11 refers to the corresponding definition file and reads out the distribution identifier DID from the predetermined portion in the designated software program (step S53). After that, referring to the selling record, the host computer determines whether or not the read distribution identifier DID is correct (step S54). When, for example, the user identifier UID is used as the distribution identifier DID, the host computer 11 decides that the distribution identifier DID is correct if the distribution identifier DID is identical to the user identifier UID input at the time of the access, and if not, the distribution identifier DID is decided to be incorrect.

When the distribution identifier DID is correct, the host computer 11 notifies the user that the software program has not been illegally duplicated (step S55) and finishes the process. When the distribution identifier DID is incorrect, the host computer 11 notifies the user that the software program has been made by an unauthorized duplication (step S56), then finishes the process.

FIG. 17 shows an example of the contents of the writing region for the distribution identifier DID. Here, the distribution identifier DID is stored in the file using, for example, the VERSIONINFO resource of WINDOWS. In this figure, "AAAAAAAA" written in a block of "040904E4" corresponds to the writing region for the distribution identifier DID.

FIG. 18 shows an example of the definition file used for the installation which corresponds to the software program. The definition file in this figure indicates that the name of the file in which the writing region of the distribution identifier DID is located is SOFT.EXE, and that eight characters which start from an address of 8E80 correspond to the writing region.

When the registered software program is sold, the distribution identifier DID in the writing region of the original file used for the registration is changed to, for example, the user identifier UID of the user who purchases the software program before the file is distributed.

FIG. 19 shows an example of the renewal of the distribution identifier DID shown in FIG. 17. In this figure, the eight characters of "AAAAAAAA", which are written in the region of the addresses from 8E80 to 8E87 in the file of SOFT.EXE, are changed to the distribution identifier DID of "GDF02256", before the software program is distributed.

Using the above described method, information which identifies the distribution of the sold software program is written in the file of the sold software program and can be read out from the file as the need arises. Since the distribution identifier DID is set by the host computer 11, it becomes impossible to use falsified information for the distribution identifier DID. Further, the unauthorized duplication of the software program can be prevented if the vendor notifies the user that the distribution identifier DID is written in the software program.

By adding information specific to the host computer 11 to the distribution identifier DID or combining the coding techniques, it becomes very difficult for the user to rewrite the distribution identifier DID by himself. Furthermore, the producer of the software program can use the distribution identifier DID in order to investigate the distribution route of the software program that he wrote.

According to the invention, the selling history of the software program can be effectively managed and services useful for both the user and the vendor can be provided in the system in which software programs are sold and installed on-line.

If, for example, the distributed software program is accidentally destroyed, a free restoring service can be provided by referring to the selling history. Therefore, the user does not need to expend time in backing up the software program, and the vendor can monitor for any unauthorized duplication. In addition, the vendor can check whether or not the software program in use is the result of a duplication in response to a request from a user.

The present invention can be applied to a software distribution system when the function of disclosing unauthorized duplication is needed for systems in the future.

What is claimed is:

1. An identifier managing device used in a software distribution system in which a software program is distributed to a terminal from a distribution center through a network, comprising:

software storage means for storing the software program to be distributed through the network;

user information storage means for storing user information including a user identifier indicating a user to which the software program is distributed;

terminal information storage means for storing terminal information including a terminal identifier indicating a terminal in which the software program is installed; and managing means for managing the user information and the terminal information by relating the user information stored in the user information storage means with the terminal information stored in the terminal information storage means.

2. An identifier managing device according to claim 1, further comprising;

a distribution record storage means for storing a distribution record of the software program in relation to the terminal identifier; wherein the managing means manages a distribution history of the software program using the user information, the terminal information, and the distribution record.

3. An identifier managing device according to claim 2, wherein the user information includes a name of the user, the terminal information includes a model name of the terminal in which the software program is installed, the distribution record includes a name of the software program and a distribution date of the software program, and the distribution history includes the name of the user, the model name of the terminal, the name of the software program, and the distribution date of the software program.

4. An identifier managing device according to claim 2, wherein the managing means reads the user information, the terminal information, and the distribution record to provide a restoration service of the software program to the user when the software program becomes unserviceable after the software program is installed.

5. An identifier managing device according to claim 1, wherein the managing means requires a payment for a distribution service of the software program to the user.

6. An identifier managing device according to claim 2, wherein the distribution record includes information showing whether or not the software program is sold to the user, and when the software program becomes unserviceable after the software program is installed and when the managing means recognizes that the software program is sold to the user by referring to the user information and the distribution record, the managing means restores the software program.

7. An identifier managing device according to claim 1, wherein the managing means requires a payment for a distribution service of the software program to the terminal.

8. An identifier managing device according to claim 2, wherein the distribution record includes information showing whether or not the software program is sold to the terminal, and when the software program becomes unserviceable after the software program is installed and the managing means recognizes that the software program is sold to the terminal by referring to the terminal information and the distribution record, the managing means restores the software program.

9. An identifier managing device according to claim 2, wherein the managing means provides service information about the software program to the user by referring the user information, the terminal information, and the distribution record.

10. An identifier managing device according to claim 9, wherein the service information includes information about an update of the software program.

11. An identifier managing device according to claim 1, wherein when the terminal in which the software program is installed is transferred from a first user to a second user, the managing means relates an identifier indicating the second user to the terminal identifier instead of an identifier to the first user to transfer rights to the software program attached to the terminal to the second user.

12. An identifier managing device according to claim 1, wherein the user information includes a user password which is associated with the user identifier by the user, and the managing means recognizes an access from the user using the user identifier and the user password.

13. An identifier managing device according to claim 1, wherein the terminal information includes a first terminal password associated with the terminal identifier, and the managing means recognizes an access from the terminal using the terminal identifier and the first terminal password.

14. An identifier managing device according to claim 13, further comprising terminal password changing means for changing the first terminal password to a second terminal password when a terminal having the first terminal password accesses the distribution center, wherein the managing means relates the second terminal password to the terminal identifier.

15. An identifier managing device according to claim 14, wherein when a terminal having the terminal identifier and a terminal password which does not correspond to the terminal password accesses the distribution center, the managing means assigns a new identifier to the terminal having the terminal password and manages the terminal having the new terminal password.

16. An identifier managing device used in a software distribution system in which a software program is distributed to a terminal from a distribution center through a network, comprising:

software storage means for storing the software program to be distributed through the network; and distribution identifier adding means for writing a distribution identifier into the software program stored in the software storage means.

17. An identifier managing device according to claim 16, further comprising definition file storage means for storing a definition file in which information used for writing the distribution identifier is described, wherein the distribution identifier adding means writes the distribution identifier into the software program by referring to the definition file stored in the definition file storage means when the software program is distributed.

18. An identifier managing device according to claim 17, wherein the information for writing the distribution identifier includes a position of a region for writing the distribution identifier allocated in the software program.

19. An identifier managing device according to claim 17, further comprising managing means for checking a distribution identifier of a software program distributed to a user who accesses the distribution center by referring to the definition file.

20. An identifier managing device according to claim 16, further comprising distribution record storage means for storing a distribution record of the software program, wherein the distribution identifier adding means writes the distribution identifier into the distribution record stored in the distribution record storage means when the software program is distributed.

21. An identifier managing method used for managing a software program distributed to a terminal from a distribution center through a network, including the steps of:

storing user information including a user identifier indicating a user to which the software program is to be distributed through the network;

storing terminal information including a terminal identifier indicating a terminal in which the software program is installed; and managing the user information and the terminal information by relating the user information with the terminal information.

22. An identifier managing method according to claim 21, further including the steps of;

storing a distribution record of the software program in relation to the terminal information; and managing a distribution history of the software program using the user information, the terminal information, and the distribution record.

23. An identifier managing method according to claim 21, further including the steps of;

providing a first terminal password associated with the terminal identifier to the terminal;

recognizing an access to the distribution center from the terminal by the terminal identifier and the first terminal password; and changing the first terminal password to a second terminal password to relate the second terminal password to the terminal identifier when a terminal having the first terminal identifier accesses the distribution center.

24. An identifier managing method used for distributing a software program to a terminal from a distribution center through a network, including the steps of;

writing a distribution identifier into the software program; and recognizing the software program distributed to the terminal from the network by the distribution identifier written in the software.

* * * * *